United States Patent [19]

Baker et al.

[11] Patent Number: 4,566,495

[45] Date of Patent: Jan. 28, 1986

[54] CONCENTRIC WALLED CONDUIT FOR A TUBULAR CONDUIT STRING

[75] Inventors: John R. Baker; David V. Chenoweth; David M. McStravick, all of Houston, Tex.

[73] Assignee: Baker Oil Tools, Inc., Orange, Calif.

[21] Appl. No.: 587,560

[22] Filed: Mar. 8, 1984

Related U.S. Application Data

[63] Continuation of Ser. No. 264,728, May 18, 1981, abandoned.

[51] Int. Cl.⁴ .......................... F16L 9/18; F16L 59/14
[52] U.S. Cl. ..................................... 138/149; 138/109; 138/173; 138/DIG. 5; 285/47
[58] Field of Search ............... 138/145, 149, 173, 148, 138/109, DIG. 5; 285/47, 55; 166/57; 220/442, 429

[56] References Cited

U.S. PATENT DOCUMENTS

| | | | |
|---|---|---|---|
| 3,574,357 | 4/1971 | Tirgoviste et al. | 138/149 X |
| 3,693,665 | 9/1972 | Veerling et al. | 138/149 |
| 4,340,245 | 7/1982 | Stalder | 138/149 X |
| 4,415,184 | 11/1983 | Stephenson et al. | 138/149 |
| 4,444,420 | 9/1984 | McStravick et al. | 138/149 X |
| 4,477,106 | 10/1984 | Hutchison | 138/149 X |

*Primary Examiner*—James E. Bryant, III
*Attorney, Agent, or Firm*—Norvell & Associates

[57] ABSTRACT

A concentric walled conduit for incorporation within a tubular conduit string, and particularly for use in a subterranean well, is provided with one of the walls corrugated for substantially its entire length, preferably the inner tubular member. The annular space defined between the concentric tubular member contains a high heat resistant insulating material disposed around the outer surface of the inner tubular member. Each end of the annular space containing the insulating material is effectively sealed, and secured, such as by welds. The inner wall may be prestressed in tension for counteracting the forces which may be produced by a temperature differential between the tubular member walls of concentric conduit.

4 Claims, 4 Drawing Figures

CONCENTRIC WALLED CONDUIT FOR A TUBULAR CONDUIT STRING

CROSS-REFERENCE TO RELATED APPLICATION

This application is a continuation application of my co-pending application Ser. No. 264,728, filed May 18, 1981, entitled "Concentric Walled Conduit For A Tubular Conduit String" which is now abandoned.

BACKGROUND OF THE INVENTION

1. Field of the Invention

This invention generally relates to an insulated conduit having particular utility in subterranean wells and more particularly to a concentric walled insulated conduit having an annular space between the walls within which is deposited an insulating material and sealed therein.

2. Description of the Prior Art

In producing some subterranean wells, steam is injected into an injection well to increase recovery of hydrocarbons and for reducing high viscosity crude oil, otherwise known as "heavy crude", to a viscosity making it more readily pumpable. One technique for doing this is to inject a high quantity of steam into the production zone containing "heavy crude" for an extended period of time, such as from about three to about five weeks, at which point the viscosity of the heated crude will be reduced, and, thus made readily pumpable, through a production well in communication with the production zone, or by modifying the injection well. A steam "flood" may also be provided by known techniques, generally through an injection well, to drive the flood and the produced hydrocarbons to a nearby production well.

One of the major problems in injecting steam into a subterranean production zone through conventional well production tubing is that the steam loses a large quantity of its heat to the well bore casing and surrounding formation as it travels downwardly to the production zone.

Attempts have been made in the past to reduce the heat loss of steam introduced into subterranean formations, one such attempt being shown in U.S. Pat. No. 3,511,282, issued on May 12, 1970. This patent discloses a dual-wall tube structure having insulation sealed in the annulus between the inner and outer walls by bushings respectively welded at each end between the inner wall and the outer wall. The inner wall is prestressed in tension prior to being welded to the outer wall. The space defined between the inner and outer walls is filled with a conventional insulating material, such as calcium silicate. Although this technique may be satisfactory in some oil field installations, it is not satisfactory for all oil field installations where large temperature differentials are encountered between the inner and outer walls. In this case, even though the inner wall is prestressed in tension, the inner wall as it is heated will elongate with respect to the outer wall so that the inner wall may even change from a tension to a compression condition with the attendant danger of buckling. The magnitudes of the forces generated are such that localized stresses are created in the weld areas causing cracks which permit exposure of the insulation to well fluids and eventually causing failure or degradation of the insulating structure. Centralizers are incorporated to reduce buckling, but may also, in turn, contribute to a loss of heat because of the generally durable nature of such devices.

Another known technique of handling the aforedescribed temperature differential and resulting elongation between the inner and outer walls of an insulating tube is to place a thin walled bellows between the two walls at each end of the assembly, one end of each of the bellows being rigidly attached to the inner wall, and the other end of the bellows being rigidly attached to the outer wall. This technique, of course, relieves the strain on the welds and joining structure between the walls due to the relative movement between the inner and outer walls. However, the bellows introduce other problems, namely, the bellows are comparatively thin walled and delicate, being typically formed from a heat resistant, springly material, which cannot withstand the rough handling normally encountered in the oil patch.

SUMMARY OF THE INVENTION

Generally, a concentric walled conduit constructed in accordance with the invention incorporates corrugating one of the tubular members, preferably the inner tubular member, along its substantially entire length, so that when it is relatively hot and the outer tube is relatively cool, its tendency is to elongate without generating any excessive forces acting on the concentric members or the securing means connecting such members.

More particularly, the concentric walled conduit structure generally comprises an outer conventional well tubular member surrounding a rugged corrugated inner tubular member to define an annular space therebetween. The ends of the inner tubular member are fixedly secured to the inside diameter of the outer tubular member. The adjoining ends of the tubular members are welded, flared or otherwise rigidly secured together to effectively seal the annular space provided between the two tubular members. The corrugations assist in preventing the insulation from compacting during use.

The space formed between the inner and outer tubular member provides an insulating barrier. Insulating material may be incorporated within this space to reduce heat loss. This insulating material may form a convective insulating barrier or it may constitute a reflective radiation shield. The reflective radiation shield may be combined with a vacuum to prevent radiant and convective heat loss. An insulating blanket, forming a convective insulating barrier which is capable of resisting deformation by tensile and shear forces, or the like, may be disposed or wrapped around and secured to the outer surface of the corrugated inner tubular member before it is secured within the outer tubular member, thus filling the space provided therebetween.

Further, the corrugated inner tubular member can be prestressed in tension and secured in this state to the outer tubular member so that when it is in its heated elongated state, due to the passage of steam therethrough, such that the resultant forces acting thereon will not be compressive.

Also, the ends of the corrugated inner tubular member can be connected to the inner surface of the outer tubular members in a manner wherein reduced loads are applied to the weld or other connections which serve as seals for the space provided between the two tubular members.

Additionally, the tubular members may be affixed at one or both ends to one another in a flared configuration which greatly reduces the distortion of the connecting threads on the outer tubular member. Further-more, flaring will permit only minimum thermal conduction along the comparatively thinned walled inner tubular member; will permit passage of oil tools or work strings through the conduit without "hang up" of the tools, etc., on a shoulder; and eliminates at least one set of welds.

A primary object of this invention is to produce a concentric walled conduit having a space between two tubular members, wherein the integrity of the sealed rigid connections, such as welds, between the two tubular members is increased, both by reducing the forces acting through the heated inner tubular member on the connections and by reducing the number of connections.

Another object of this invention is to produce a concentric walled conduit wherein forces generated by the heated corrugated inner tubular member are applied on the relatively cooler outer tubular member and not on the means sealing the space between the two tubular members, thereby greatly reducing the load on the weld.

Yet another object of this invention is to prestress a fixed corrugated inner tubular member in tension so that when it is heated, its elongation will not generate any destructive forces acting on the concentric walled conduit, caused by buckling acting on the insulation.

Other objects and advantages of the invention will become more apparent in the course of the following description.

DESCRIPTION OF THE PREFERRED EMBODIMENTS

Figure 1:
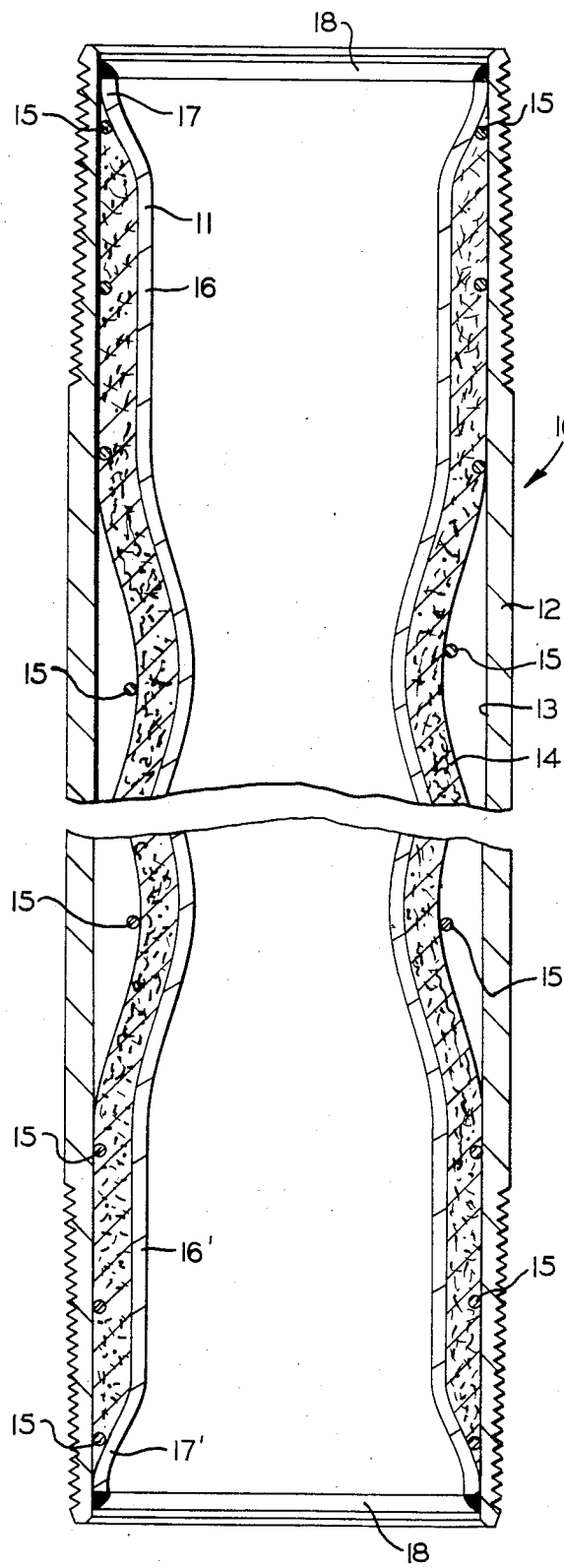
FIG. 1 is an elevational view partly in section of a concentric walled conduit constructed in accordance with the invention.

Referring now to the drawings, there is illustrated a number of concentric walled conduits and respectively designated in their entirety by the reference numerals 10, 10a, 10b and 10c. Generally, each insulating tube comprises a corrugated inner tubular member 11, 11a, 11b and 11c, respectively, assembled concentrically within an outer tubular member tube 12, 12a, 12b and 12c. The outer tubular member preferably comprises standard well tubing. The wall of the inner tubular member may be corrugated in the form of a sine wave, or in the form of a helical thread. The wall thickness of the inner tubular member is on the same order as conventional well tubing of the same diameter, thus providing a structurally rugged element but having axial springness. The inner and outer tubular members are rigidly secured to each other, either directly by welds or indirectly by structural members to be described hereinafter. An annular space 13, provided between the two tubular members is preferably filled with a blanket-type insulation material 14, such as batts of woven glass or ceramic fiber, or the like, which form a convective insulating barrier and which will withstand temperatures encountered in steam injection operations, such as 700° F. without deteriorating and/or decomposing, thus continuing to provide effective thermal insulation at these high temperatures. Conventional insulating blanket material having fibrous materials interspersed therein can be used to provide this convective insulating barrier. These fibrous materials may be either a glass-containing or a ceramic-containing material. These conventional insulating blankets with ceramic-containing or glass-containing fibers are readily available from commercial sources and are used in the preferred embodiments of this invention in their commercially available form. The insulation is wrapped around the outer periphery of the inner tubular member and firmly secured thereto by a wire or wrapping 15 wound in a helical manner around the insulation and the inner tubular member. The ends of the wire or wrapping 15 may be fastened to the inner tubular member by a tack weld (not shown) or fastened mechanically. The wire or wrapping 15 thus prevents settling of insulation 14.

As stated, the outer tubular member of the dual walled conduit is a standard well tubing joint employed in the oil field industry. Also it should be noted that the structural load is carried by the outer tubular member and employs standard buttress or other threads at each end of the outer tubular member to receive a coupling, or companionly threaded end of another concentric walled conduit, and so on, to form a continuous length or string of concentric walled insulated conduits.

Referring now to FIG. 1, it is seen that the ends of the inner tubular member 10 are respectively provided with straight portions 16 and flared portions 17 and 17' with the end of each flared portion 17 and 17' being respectively secured to the inner surface of the outer tubular member 10 by welds 18 and 18'. Also, it will be noted that the flared portions 17 and 17' define the annular space 13 in this embodiment of the invention for receiving the insulation 14. In this case, the straight portions 16 and 16' conveniently provide transition surfaces between the flared ends and the corrugated portions of the corrugated inner tubular member 11. It should be noted that the flared portions 17 and 17' are radially spaced from the corrugations on inner tubular member 11. In order to prevent heat loss it is essential that the corrugations, whether sinusoidal or helical, not come into contact with the outer tubular member. The "flared portions" 17 and 17', located only at the ends of inner tubular member 11, are provided to establish contact with the outer tubular member 12 while at the same time reducing the number of welds.

Figure 2:
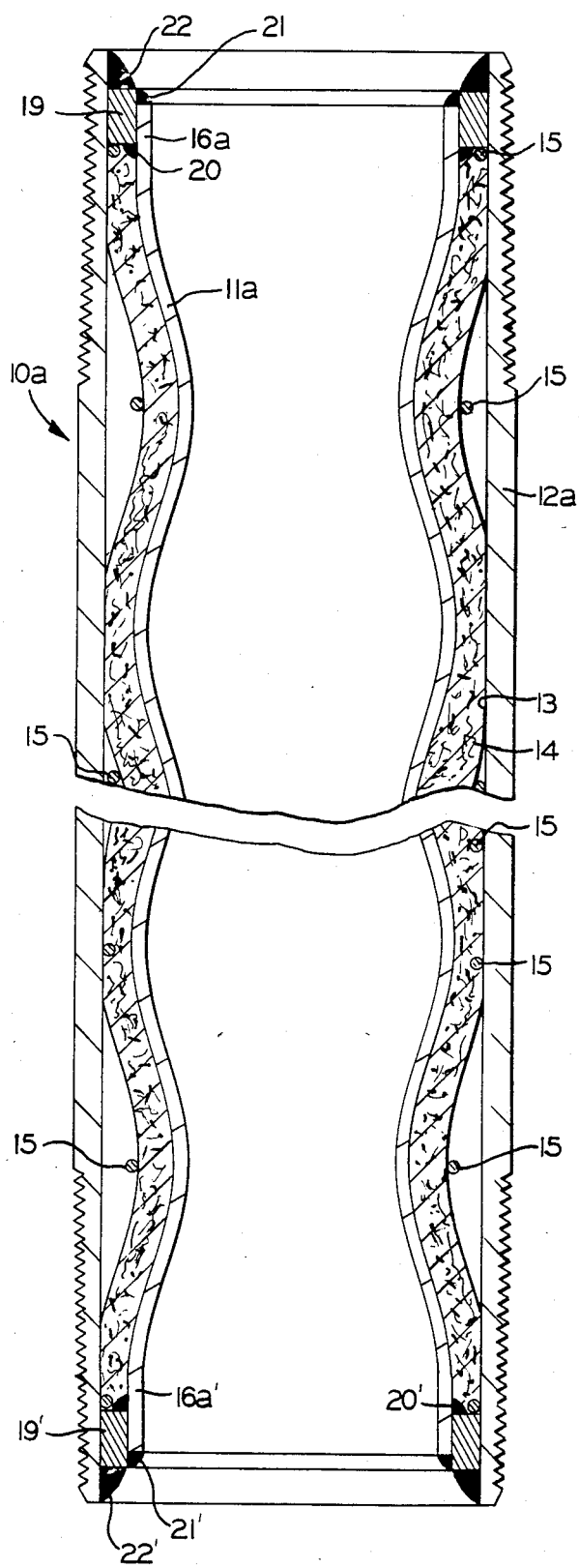
FIG. 2 is a view similar to FIG. 1, but illustrating a different joining structure for connecting the ends of the inner tubular member to the adjacent ends of the outer tubular member.

In the embodiment of the invention illustrated in FIG. 2, annular welding rings 19 and 19' are respectively provided at the ends of the straight portions 16a and 16a' of the corrugated inner tubular member 11a. The welding rings 19 and 19' are first welded to the ends of the inner tubular member by welds 20-20' and 21-21' and then to the inner surfaces of the ends of outer tubular member 10a by welds 22 and 22'. In this case, the welding rings 19 and 19' define the annular space 13 for receiving the insulation 14.

Figures 3, 4:
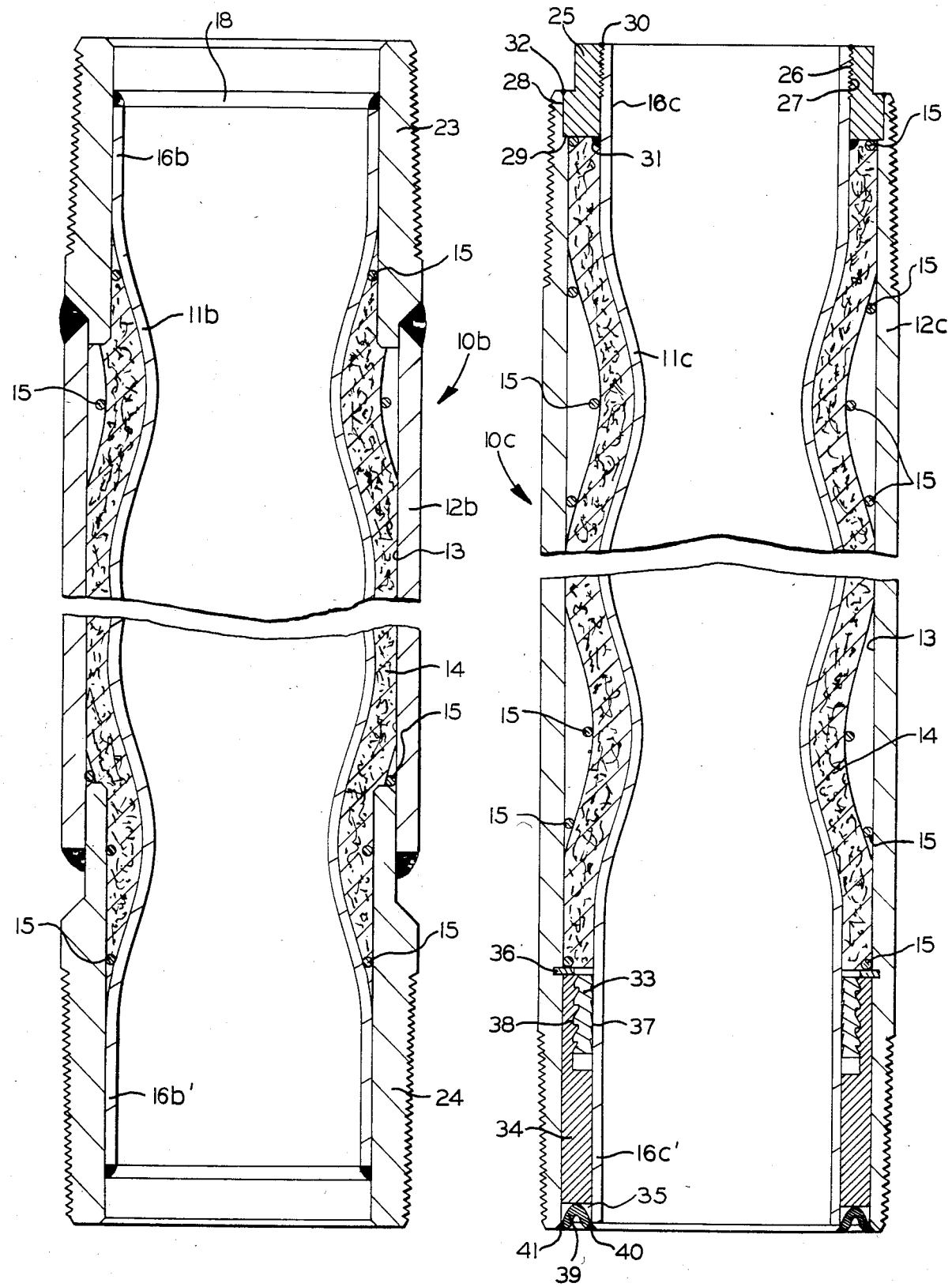
FIG. 3 is a view similar to FIG. 1, but illustrating another embodiment of the invention.
FIG. 4 is a view similar to FIG. 2, illustrating a third embodiment of the invention.

Referring now to the embodiment of the invention illustrated in FIG. 3, the opposite ends of the outer tubular member 12b are respectively provided with end adapters 23 and 24. The end adapters 23 and 24 are welded to the outer tubular member 12b and are provided with standard male buttress or other threads. The thick walls of the adapters prevent distortion of the threads during the welding process previously described for the embodiment illustrated in FIG. 1. Otherwise, the structure of this embodiment is the same as the structure disclosed in the embodiment illustrated in FIG. 1.

In the embodiment of the invention illustrated in FIG. 4, the inner and outer tubular members 11c and 12c respectively are joined structurally by a technique for prestressing the inner tubular member in tension without applying any loads on the welds employed for sealing the annular space 13 defined between the two tubular members. Referring first to the joining means located at the top end of the concentric walled conduit 10c, there is shown a spacer-weld ring 25 positioned between the tubular members 11c and 12c. More specifically, the spacer-weld ring 25 is provided with internal threads 26 and the adjacent surface of the inner tubular member 11c is provided with cooperating external threads 27 for fastening the ring 25 thereon. Preferably, the outside diameter 28 of the ring 25 has an interference fit with the inside diameter of the outer tubular member 12c, such that it conforms to a shoulder 29 therein. Accordingly, the tubular member 11c is prevented from moving in an axial direction toward the opposite end of the outer tubular member. The ring 25 can be secured to the inner tubular member tube by both a face weld 30 and a corner weld 31. Also the ring 25 is secured to the outer tubular member by a face weld 32. It should be noted that this end of the inner tubular member is mechanically joined to the outer tubular member by the threaded connection 26-27 and the shoulder 29 and transmits any forces produced by the inner tubular member directly to the other tubular member, and that the welds 30, 31 and 32 only serve as seals for this end of the annular space 13.

Referring now to the joining means located at the bottom end of the concentric walled conduit 10c, there is shown a structure comprising a body lock ring 33 and a body lock ring housing 34, both positioned in an annular gap 35 defined between the straight portion 16c' of the inner tubular member 11c and the adjacent surface of the outer tubular member 12c and held against longitudinal movement in one axial direction by a snap ring 36. The body lock ring 33 includes wickers 37 formed on its inner surface for preventing the loss of tension applied to the inner tubular member 11c. More specifically, the snap ring 36, the body lock ring 33 and the body housing 34 are placed in the gap 35 between the tubular members, and the inner tubular member 11c is prestressed in tension and then released.

The inner tubular member 11c may be prestressed by elongating it by means of a hydraulic cylinder (not shown) pulling on a mandrel (not shown) attached to the inside diameter of the inner tubular member so that the inner tubular member will be elongated relative to the outer tubular member 12c. When the inner tubular member tube 11c is released, the wickers 37 will bite into the outer surface thereof and transmit the tension force to the body lock ring housing 34 through a thread assembly 38. Thus, the inner face between the lock ring housing 34 and the snap ring 36 transmits forces produced by the inner tubular member directly to the outer tubular member 12c.

An inverted V-shaped weld ring 39 is positioned in the gap 35 between the inner and outer tubular members and is affixed thereto by continuous welds 40 and 41 for sealing the space 13. From the foregoing, it is apparent that the prestress forces of the inner tubular member are transmitted directly to the outer tubular member without being applied to the weld seams. In other words, no load is applied to the weld seams.

It should be noted that prestressing of the inner tubular member in tension is not limited to the embodiment of FIG. 4. If comparatively large temperature differentials are expected to be encountered, the inner tubular member may be elongated prior to attachment to the outer member to incorporate the desired prestress into the assembly.

Subsequent to affixation of the second ends of the tubular members, the annular area may be sealingly communicated with vacuum means for evacuating moisture and/or air therein to improve the insulating capacity of the conduit. Sealing communication with the vacuum means may be accomplished by providing a sealable opening in the outer tubular member.

The thermal insulating material may also comprise a reflective heat shield element or skin having low thermal emissivity to provide maximum heat shielding characteristics. A conventional aluminum foil may be employed to provide this radiant reflective heat shield barrier.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A concentric walled tubular conduit for forming a tubular string in a subterranean well to transport a fluid between the surface and a subterranean producing formation in an oil well, the temperature of the fluid being greater than the surrounding temperature in the well, comprising: an outer tubular member prestressed in compression; an inner tubular member prestressed in tension, and concentrically received within and spaced from the inner periphery of said outer tubular member; means for respectively rigidly securing the ends of said prestressed inner tubular member to said outer tubular member and for transmitting, between said inner and outer tubular members, forces due to differential thermal expansion and contraction along the entire length thereof, thereby reducing the prestress in both the inner and outer tubular members; and insulating material surrounding said inner tubular member, said inner tubular member having at least one of its ends outwardly flared with each end thereof sealably secured to the adjacent end of said outer tubular member, to define a sealed cavity between said tubular members.

2. A concentric walled tubular conduit for forming a tubular string in a subterranean well to transport a fluid between the surface and a subterranean producing formation in a oil well, the temperature of the fluid being greater than the surrounding temperature in the well, comprising: an outer tubular member prestressed in compression; an inner tubular member prestressed in tension; and concentrically received within and spaced from the inner periphery of said outer tubular member; means for respectively rigidly securing the end of said prestressed inner tubular member to the inner periphery of said outer tubular member and for transmitting, between said inner and outer tubular members, forces due to differential thermal expansion and contraction along the entire length thereof thereby reducing the prestress in both said inner and outer tubular members; and insulating material surrounding said inner tubular member having at least one of its ends outwardly flared with each end thereof sealably secured to the adjacent end of said outer tubular member, to define a sealed cavity between said tubular members.

3. A concentric walled insulated tubular conduit for forming a continuous tubing string to transport a fluid between the surface and a subterranean procuding formation in an oil well, the temperature of the fluid being greater than the surrounding temperature in the well, comprising: an outer tubular member comprising an oil well tubing joint; an inner tubular member concenterically received within and spaced from the inner periphery of said outer tubular member, at least one of the ends of the inner tubular member being outwardly flared; sealed rigid connection means for fixedly securing the ends of the inner tubular member to the ends of the outer tubular member and transmitting, between said inner and outer tubular members, forces due to differential thermal expansion and contraction along the entire length thereof; and insulating material surrounding said inner tubular member, to define a sealed cavity between said tubular members.

4. The concentric walled tubular conduit of claim 3 wherein the connection means comprises a weld between the end of the outwardly flared inner tubing and the end of the outer tubing.

* * * * *